US011980260B2

(12) United States Patent
Parikh

(10) Patent No.: US 11,980,260 B2
(45) Date of Patent: May 14, 2024

(54) SELECTIVELY ILLUMINATED JEWELRY, AND A SYSTEM AND METHOD THEREOF

(71) Applicant: PARIKH HOLDINGS LLC, Scarsdale, NY (US)

(72) Inventor: Aniket Parikh, Scarsdale, NY (US)

(73) Assignee: PARIKH HOLDINGS LLC, Scarsdale, NY (US)

( * ) Notice: Subject to any disclaimer, the term of this patent is extended or adjusted under 35 U.S.C. 154(b) by 0 days.

(21) Appl. No.: 17/818,868

(22) Filed: Aug. 10, 2022

(65) Prior Publication Data

US 2024/0049843 A1 Feb. 15, 2024

(51) Int. Cl.
*A44C 15/00* (2006.01)
*A44C 17/02* (2006.01)
(Continued)

(52) U.S. Cl.
CPC .......... *A44C 15/0015* (2013.01); *A44C 17/02* (2013.01); *F21V 23/0435* (2013.01); *F21V 33/0004* (2013.01); *H05B 47/19* (2020.01); *F21W 2121/06* (2013.01); *F21Y 2105/16* (2016.08)

(58) Field of Classification Search
CPC . A44C 15/0015; A44C 17/02; F21V 23/0435; F21V 33/0004; F21Y 2105/16; F21W 2121/06
See application file for complete search history.

(56) References Cited

U.S. PATENT DOCUMENTS 4,973,835 A * 11/1990 Kurosu .............. A44C 15/0015 250/214 AL
6,553,786 B1 * 4/2003 Kwiat .................... A44C 17/00 63/26
(Continued)

FOREIGN PATENT DOCUMENTS

AT 2148254 * 1/2010 ........... A44C 17/006
BE 1760547 * 3/2007 ............. G04B 19/32
(Continued)

OTHER PUBLICATIONS

English Machine Translation of EP2148254A1 provided by ESPACENET (Year: 2010).*
(Continued)

*Primary Examiner* — Zheng Song
(74) *Attorney, Agent, or Firm* — Leason Ellis LLP

(57) ABSTRACT

A system and method selectively illuminate gems in a piece of jewelry, allowing the jewelry to be transformed into a utilitarian object as well as a decorative object. A person can wear the jewelry ornamentally, as well as use the jewelry like a watch or a touch screen. The jewelry includes a plurality of gems, a plurality of light sources, and a controller. The plurality of gems is arranged in at least one grid. Each of the light sources emits light reachable to a corresponding gem and oriented to illuminate the corresponding gem. The controller is responsive to a received input and is configured to selectively control the plurality of light sources to selectively illuminate the light sources to shine or not shine light on each of the plurality of gems. The light selectively changes an optical property of each gem corresponding to the received input.

27 Claims, 9 Drawing Sheets

(51) Int. Cl.

| | |
|---|---|
| ***F21V 23/04*** | (2006.01) |
| ***F21V 33/00*** | (2006.01) |
| ***H05B 47/19*** | (2020.01) |
| *F21W 121/06* | (2006.01) |
| *F21Y 105/16* | (2016.01) |

(56) References Cited

U.S. PATENT DOCUMENTS

| | | | | |
|---|---|---|---|---|
| 6,833,539 | B1 * | 12/2004 | Maeda | A44C 15/0015 63/29.1 |
| 7,033,037 | B2 * | 4/2006 | Chen | F21V 5/00 362/104 |
| 10,925,358 | B1 * | 2/2021 | Shawhan | A44C 15/0005 |
| 2014/0047867 | A1 * | 2/2014 | Sunne | A44C 17/04 63/26 |
| 2014/0323183 | A1 * | 10/2014 | Klein | H04M 1/6066 455/569.1 |
| 2016/0174675 | A1 * | 6/2016 | Bedman | A47F 3/005 206/6.1 |
| 2018/0033919 | A1 * | 2/2018 | Lee | G01N 21/87 |
| 2018/0064278 | A1 * | 3/2018 | Reese | B44C 5/00 |
| 2018/0307050 | A1 * | 10/2018 | Dholakiya | A44C 17/02 |
| 2019/0000242 | A1 * | 1/2019 | Didur | F21V 5/04 |
| 2022/0112996 | A1 * | 4/2022 | Ashley | A44C 15/0015 |
| 2022/0256985 | A1 * | 8/2022 | See | A44C 25/002 |
| 2022/0256986 | A1 * | 8/2022 | See | A44C 25/002 |

FOREIGN PATENT DOCUMENTS

| | | | |
|---|---|---|---|
| CA | WO 2017/156633 | * 9/2017 | A44C 15/0015 |
| GB | WO 99/23906 | * 5/1999 | A44C 15/0015 |
| GB | WO 2006136587 | * 12/2006 | A44C 15/0015 |
| KR | 1020160058285 | * 5/2016 | A44C 9/00 |
| WO | WO 02/067716 | * 9/2002 | A44C 19/00 |
| WO | WO 2010/052702 | * 11/2009 | A44C 15/0015 |
| WO | WO 2019/016697 | * 1/2019 | G04B 47/044 |

OTHER PUBLICATIONS

International Search Report and Written Opinion in PCT Application No. PCT/US23/71983, dated Sep. 13, 2023.

* cited by examiner

SELECTIVELY ILLUMINATED JEWELRY, AND A SYSTEM AND METHOD THEREOF

FIELD OF THE DISCLOSURE

The present disclosure relates generally to jewelry, and, more particularly, to a system and method for selectively illuminating gems in a piece of jewelry.

BACKGROUND OF THE DISCLOSURE

Fluorescence (FL) and phosphorescence (PH) in a gemstone, such as a diamond, is usually a naturally occurring phenomenon. With the advent of technology, such as chemical vapor deposition (CVD) or high pressure, high temperature (HPHT) methods, or other techniques, such FL and PH of gems can be artificially created. Other gems may have other unique qualities and properties that can be exploited.

FL and PH allows a gem to glow under certain lighting conditions from an external light source; for example, under ultraviolet (UV) light, and creates a glow or leaves an afterglow, which can occur even after an external light source may have stopped shining. FL may occur in different colors such as blue, white, green, red, yellow, etc. depending on the atomic structure of the gases or elements that are in the gem. The brightness, duration, and other characteristics of the glow depend on the amount of FL or PH elements in the gem. The naturally occurring or created FL and PH phenomenon in jewelry can be used to highlight the colors of gems.

Gems without these characteristics are usually inert to the different lighting conditions. Such inert gems tend to remain or show their original colors or only a slight hint due to the actual color of the light falling upon or passing through them.

SUMMARY OF THE DISCLOSURE

According to an embodiment consistent with the present disclosure, a system and method selectively illuminate gems in a piece of jewelry, allowing the jewelry to be transformed into a utilitarian object as well as a decorative object. A person can wear the jewelry ornamentally, as well as use the jewelry like a watch or a touch screen. Wearers of such jewelry using the system and method can create their own designs and express themselves as a show of lit gems operating as pixels. The system and method also allow wearers to communicate with others In an embodiment, an item of jewelry comprises a gem, a light source, and a controller responsive to a received input and configured to control the light source to selectively illuminate the light source to shine light on the gem. The gem selectively changes a visual property thereof corresponding to the received input. The light source is selected from the group consisting of: an ultraviolet (UV) light source, a microwave light source, a radio wave light source, and an optical light source; and the light shined on the gem corresponds to the type of light source. The visual property of the gem is selected from the group consisting of: color, brightness, intensity, hue, and tint. Other visual properties can include the appearance of the cut, shape, inclusion, and other visible or light-highlighted traits.

The item of jewelry further comprises a receiver configured to receive the input. The receiver receives the input over a communication protocol selected from Bluetooth or WiFi. Other known communication methods or protocols can be used. For example, a person can use a laser pulse directed toward the item of jewelry as the input. Implementations to convey the input to the item of jewelry can also include wired implementations. The received input is received from a communication device. The communication device can have an inbuilt chip or circuit as well as programs and applications. The communication device is selected from the group consisting of: a central processing unit (CPU), a cellular phone, and a smartphone. Additional communications devices can be implemented including handheld devices accepting manual input, or input using a stylus.

In another embodiment, a system comprises a communication device and an item of jewelry. The communication device includes a processor, an input/output device configured to receiving a user input from a user and configured to output the user input to the processor, and a communication interface configured to transmit the user input. The item of jewelry includes a gem, a light source, a receiver configured to receive the transmitted user input, and a controller responsive to the received input and configured to control a light source and any other known devices and mechanism to selectively illuminate the light source to shine light on the gem. The gem selectively changes a visual property thereof corresponding to the received input. In an alternative embodiment, the controller delivers or controls any audio, sensory, or other devices to provide a device-related response.

The light source is selected from the group consisting of: an ultraviolet (UV) light source, a microwave light source, a radio wave light source, and an optical light source, and the light shined on the gem corresponds to the type of light source. The visual property of the gem is selected from the group consisting of: color, brightness, intensity, hue, and tint. Other visual properties can include the appearance of the cut, shape, inclusion, and other visible or light-highlighted traits. The receiver receives the transmitted user input over a communication protocol selected from Bluetooth or WiFi. The communication device is selected from the group consisting of: a central processing unit (CPU), a cellular phone, and a smartphone. The communication device can be a smartphone executing a program to operate with the input/output device. The program is selected from the group consisting of: an application, an app, and an applet. The program can be a predefined program capable of communicating with another predefined program installed in a chip set in the item of jewelry.

In a further embodiment, a method comprises providing an item of jewelry with a receiver, a controller, a light source, and a gem. The method also comprises providing a communication device with an input/output device, receiving a user input from a user at the input/output device, transmitting the user input to the receiver, and responsive to the received input, controlling the light source using the controller. The method further comprises generating light corresponding to the received input, illuminating the gem using the generated light, and causing the gem to selectively display a visual property corresponding to the user input. Alternatively, the method causes the gem to selectively output audio or sensory properties corresponding to the user input. Accordingly, a user is allowed to add sound and vibrations to provide the item of jewelry with additional audio and sensory affects. A user can add such sound and vibrational settings or enter such settings when creating user-defined files specifying visual effects. The user-defined files can also specify the timing and coordination of each visual, audio, and sensory function separately or together.

The light source is selected from the group consisting of: an ultraviolet (UV) light source, a microwave light source, a radio wave light source, and an optical light source, and the light illuminating the gem corresponds to the type of light source. The visual property of the gem is selected from the group consisting of: color, brightness, intensity, hue, and tint. The receiver receives the input over a communication protocol selected from Bluetooth or WiFi. The communication device is selected from the group consisting of: a central processing unit (CPU), a cellular phone, and a smartphone. The communication device can be a smartphone executing a program to operate with the input/output device.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to systems and methods for selectively illuminating gems in a jewelry item. The systems and methods of the present disclosure leverage the fluorescence (FL) and phosphorescence (PH) properties of gemstones on a jewelry item by selectively irradiating the gemstones in order to display visual images. As noted, FL and PH can cause a gem to glow under certain lighting conditions from an external light source; for example, under ultraviolet (UV) light, PH creates an afterglow, which can occur even after an external light source may have stopped shining. FL can occur in different colors such as blue, white, green, red, yellow, etc. depending on the atomic structure and characteristics of the gases or elements that are in the gem. The brightness, duration, and other characteristics of the glow depend on the amount of FL or PH elements in the gem. The naturally occurring or created FL and PH phenomenon in jewelry can be used to highlight the colors of gems.

Figure 1:
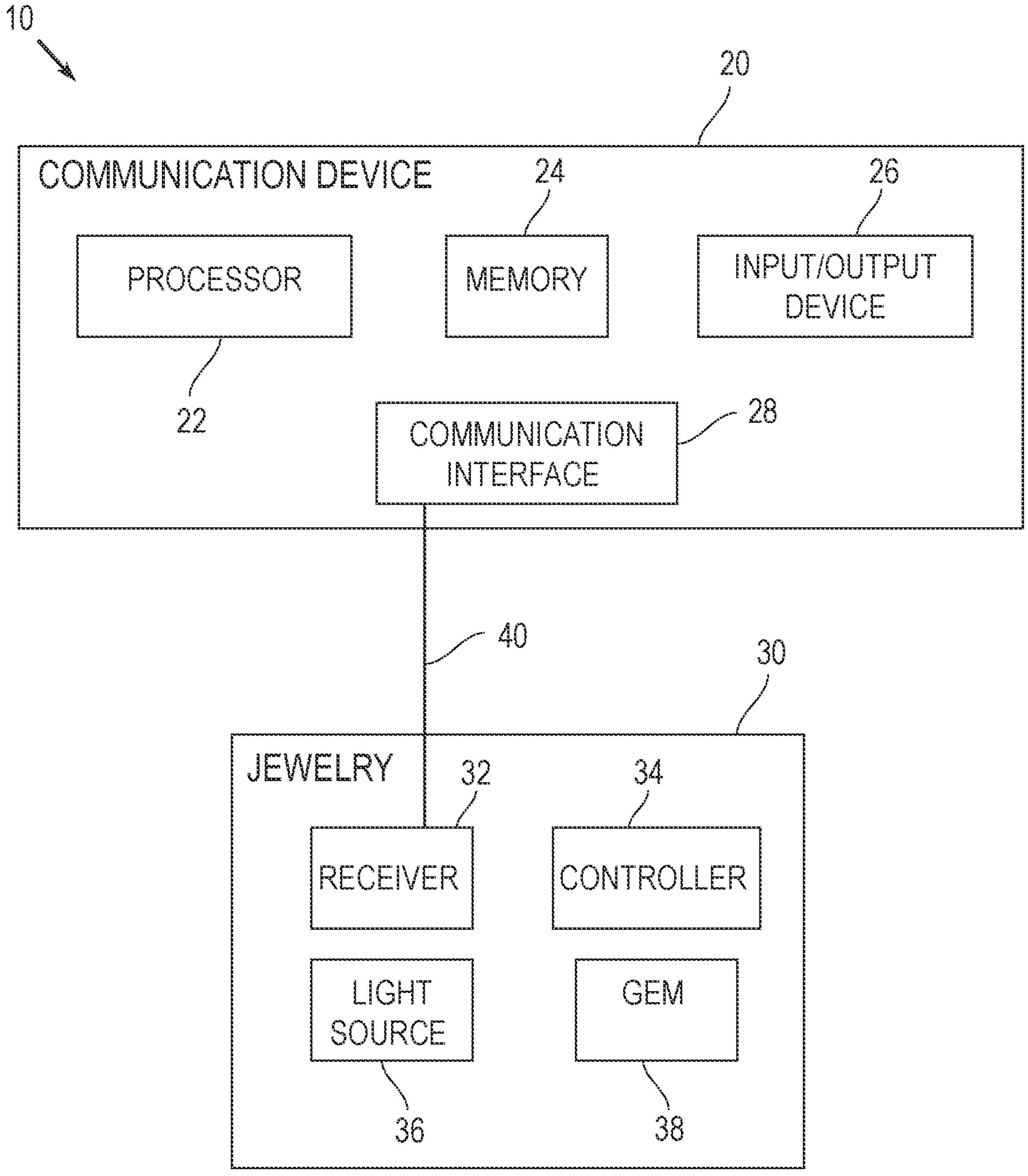
FIG. 1 is a schematic of a system for selectively illuminating gems in a jewelry item, according to an embodiment.

Referring to FIG. 1, a system selectively illuminating gems in a jewelry item 10 includes a communication device 20 and the item or piece of jewelry 30. The communication device 20 includes a processor 22, a memory 24, an input/output device 26, and a communication interface 28. The item of jewelry 30 includes a receiver 32, a controller 34, a light source 36, and a gem 38. The communication device 30 can be a computing device having a central processing unit (CPU). Alternatively, the communication device 30 can be a cellular phone, a smartphone, or other processing devices configured to relay messages at least to the item of jewelry 30 through the communication interface 28 using wireless or wire-based signals 40 with a communication protocol, such as Bluetooth or WiFi. The relayed messages can correspond to user inputs entered by a user through the input/output device 26.

An example of how a relay would work is to use a smartphone to send a signal to the receiver 32 of the item of jewelry 30, instructing the item of jewelry 30 to cause a UV light source 36 to emit UV light onto at least one specific gem 38. The emitted light from the light source is reachable to the gem 38. A plurality of gems 38 can be included in the form of an array or a grid on the jewelry item. The gems 38 can be selectively lit as a single point or an array of points or lines so as to denote an alphanumerical character, define an object such as a shape, represent a message, an emoji, a graphic, an image, etc. using the array of gems. Basically, the item of jewelry is configured to operate like a screen, with the gems 38 defining pixels on the screen, and the gems 38 being selectively lit up to output a visual image.

In some instances, if a gem 38 is exposed to external UV light from other sources, the gem 38 naturally shine. Accordingly, in an embodiment, the system 10 can be configured to counter such external UV light effects on one or more gems, particularly, by illuminating the one or more of the gems from below or from the side, with an inverse light from a light source to change or reduce the outside light effect, and still have the character or image visible. Alternatively, one or more gems surrounding a given gem can be illuminated. For example, if there is an external UV light, the given gem shines, and a counteracting light conveyed to the surrounding gems is provided or an inverse light is provided to negate the glow or afterglow of the surrounding gems.

The characters or shapes to be displayed on the jewelry item 30 can be user-defined by the use of an application ("app") operating on the smartphone, in which a user can define the image to be displayed, or otherwise select the gems 38 which the user wants to light up to display the overall selected character or shape. In addition, any visual, audio, and sensory inputs such as physical touches by a finger of a user by a stylus, as well as the timings of such inputs to coincide with a visual effect, can be provided. Such input visual, audio, and sensory inputs allow the relay of inputs to control which devices, machines, or parts of the item of jewelry 30, as well as how and when the item of jewelry 30 is controlled.

In an example, the gems 38 can be arranged as a grid, such as an 8×8 grid, wherein the gems can be individually and selectively lit up to create the user-defined characters or shapes. The selections of gems 38 to illuminate can be relayed by itself or as a series of pixels creating a single design or a series of images in a manner similar to a movie or text messages, etc.

The grid of gems 38 can also be selectively illuminated according to the internal clock of the smartphone, for instance, to illustrate the time in numerals, such as digits, or to illustrate a watch face with hands of the watch moving with the time, displaying a date, etc.

In some embodiments, the system can comprise multiple users with respective jewelry items and respective communication devices. For instance, a first user can, using their communication device, send a message to a second user's communication device, or jewelry item, for output using the second user's jewelry item.

Figure 2:
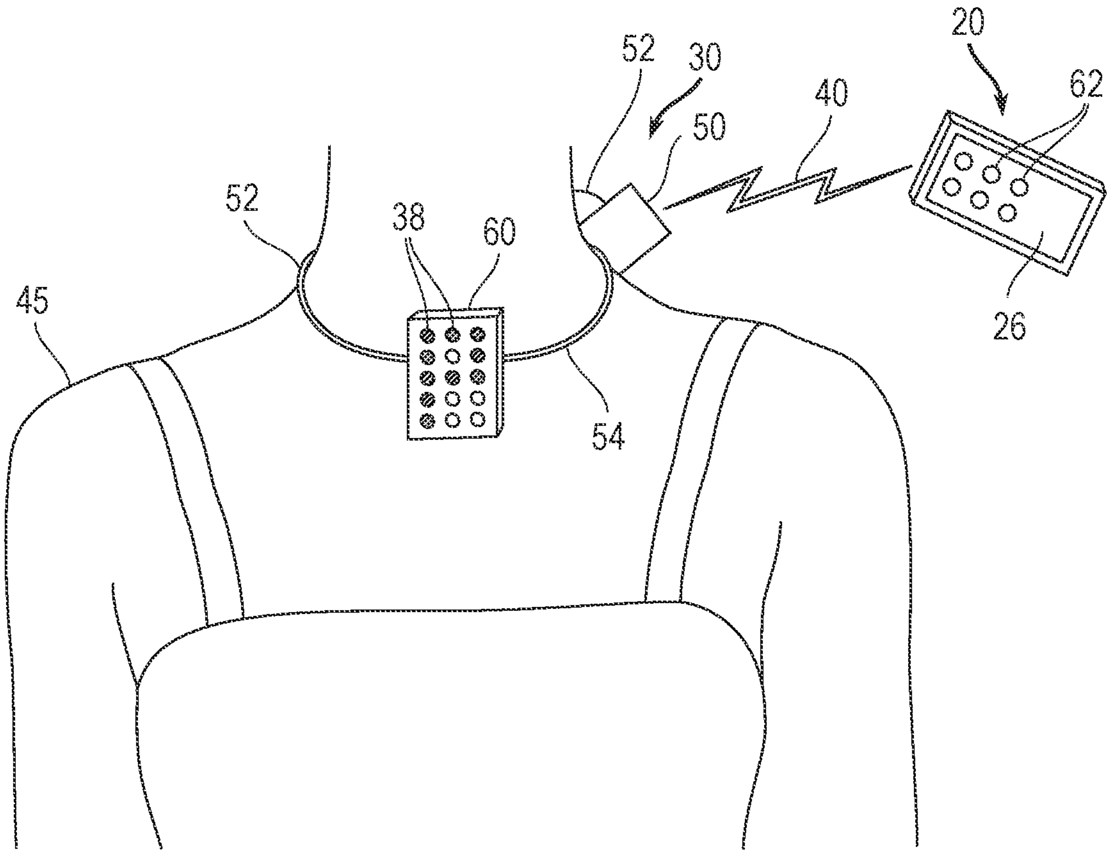
FIG. 2 illustrates the system of FIG. 1 in an example configuration worn by a person.

FIG. 2 illustrates an example implantation of the system 10 according to an embodiment. Referring to FIG. 2, the item of jewelry 30 can be worn by a person 45, and can comprise a housing 50 retaining the receiver 32 and the controller 34, and wires 52, 54 connecting the housing 50 to the housing 60 on which at least one gem 38 is set. The housing 60 also includes one or more internally disposed light source 36 (not shown). The wires 52, 54 can be composed of plastic, rubber, wire, or fiber optic cable. Alternatively, the wires 52, 54 can be composed of biomaterials that can radiate FL. Furthermore, the wires 52, 54 can be tubular structures containing a FL liquid. Preferably, at least one of the wires 52, 54 is an electrical wire for electrically connecting the receiver 32 and/or the controller 34 to the light source 36 to control the light source 36. The wires 52, 54 can provide serial or parallel communications between the receiver 32, the controller 34, and the light source 36. Alternatively, the wires 52, 54 can be electrically non-conductive, and the receiver 32 and/or the controller 34 communicate wirelessly with the light source 36 to control the light source 36.

Referring again to FIG. 2, the item of jewelry 30 can have an electrical power source, such as a battery pack or any sort of electric or solar cell or connection to the smartphone 20 or other devices to receive the energy that is needed to operate the jewelry item. For example, the electrical power source can be a hand-wound or rotary device using springs and piezoelectric elements for converting manual winding by a user into stored electrical energy. Also, the battery pack can be rechargeable. A detachable back portion can also house the electrical power source such as a rechargeable power source. Still further, the electrical power source can be solar-powered for converting and storing sunlight into stored electrical energy to power the item of jewelry 30. A back portion of the housing 60 holding the lighting components, the power component, and other components can be provided to make the jewelry item more appealing in look and functionality. The housing 60 can be held in any practical or impractical way or attached in any way to the item of jewelry 30. For example, the housing 60 can be removable (e.g., if not needed for day-time wear), and added (e.g., for night-time wear).

Figure 9:
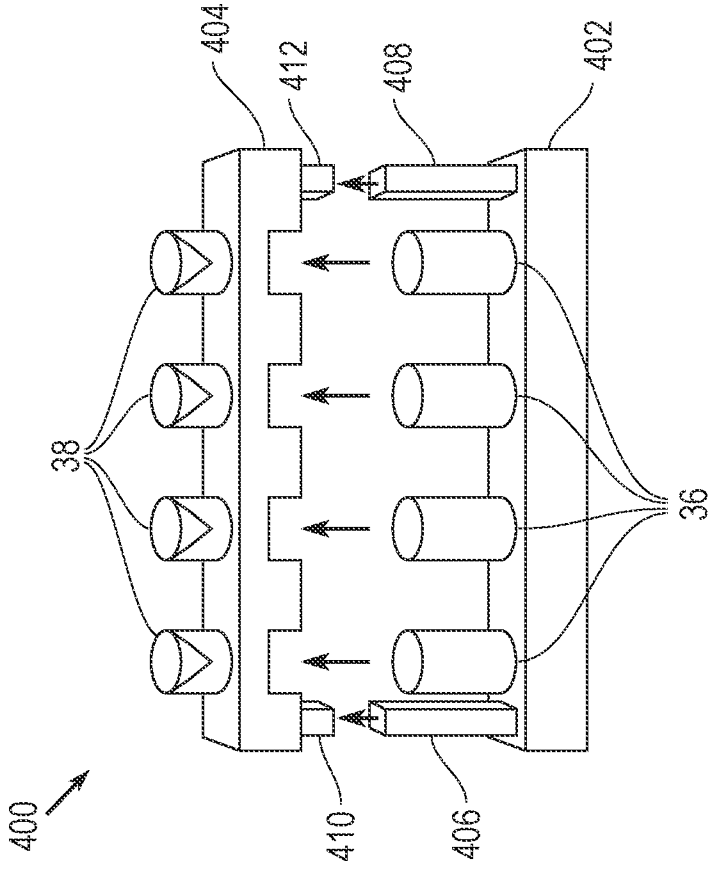
FIG. 9 illustrates a night-time casing.

Referring to FIG. 9, the item of jewelry 400 can include a detachable light source array 402 and a night-time casing 404. The detachable light source array 402 has the at least one light source 36 for illuminating corresponding gems 38 disposed on the night-time casing 404. An attachment device 406, 408 on the light source array 402 couples to a respective attachment device 410, 412 for removably attaching the light source array 402 to the night-time casing 404. For example, the attachment devices 406, 408, 410, 412 can be composed of hook-and-loop fasteners which removably couple with each other. Any other known attachment devices 406, 408, 410, 412 can be used as well.

Figure 10:
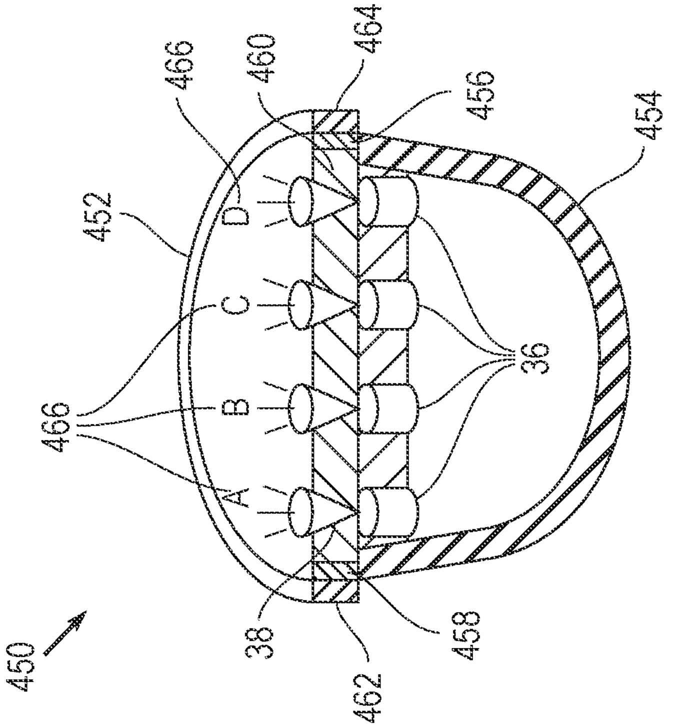
FIG. 10 illustrates a daytime casing.

Referring to FIG. 10, the item of jewelry 450 can include a daytime casing 452. The daytime casing 452 can be included in or with the housing 60. For example, the item of jewelry 450 can include a wristband 454 on which is mounted to a base 456 retaining the gems 38 adjacent to respective light sources 36. The daytime casing 452 can be removably mounted to the base 456 by attachment devices 458, 460, 462, 464, with attachment devices 458, 460 coupled to the base 456, and the attachment devices 462, 464 coupled to the daytime casing 452. For example, the attachment devices 458, 460, 462, 464 can be composed of hook-and-loop fasteners which removably couple with each other. Any other known attachment devices 458, 460, 462, 464 can be used as well. The daytime casing 452 can be composed of a reflective material or a one-way light-conveying material. The reflective material or the one-way light conveying material can be composed of glass, plastic, a polymer, or any known material capable of reducing daytime light, glare, sun rays, or other ambient light. Such reduction of ambient light allows the displayed characters 466 on the item of jewelry 30 to be visible or more visible to be read in daytime or under bright light conditions. Thus, the daytime casing 452 allows the item of jewelry 450 to retain its utilitarian properties under any lighting conditions. In addition, the daytime casing 452 can also be protective of the gems 38 as the item of jewelry 450 is worn.

The night-time casing 404 and the daytime casing 452 described above can be used as a daytime casing or a night-time casing, respectively. Alternative embodiments of the casings 404, 452 can be moved from top to bottom, moved bottom to top, or moved, rotated, or clipped onto other components described above as needed. In this manner, the items of jewelry described above can be configured without lighting elements, and so can be used only as a fashion accessory.

The items of jewelry described above can include other accessories. Such accessories can be sold, given, or otherwise provided separately if needed or desired by a user. The accessories, such as chains or bracelets, can also carry any of the lighting, battery, or processing units as well for better functionality. Such accessories can have additional gems as well as the illuminated gems 38 described above, and can be hollow also to insert the needed elements and components described above. Such hollow portions of the accessories can also accommodate any other known gadgets.

As shown in FIG. 2, the array or grid of gems 38 can be a 3×5 grid with a selective set of the gems 38 lit thereby changing a visual property, such as color. For example, as shown, the gems can be selectively lit to display the letter "P", which can be an abbreviation of a personal name or other meaningful words. Depending on the size and selective set of lit gems 38, different alphanumeric symbols as well as shapes, other symbols or images can be displayed using the gems 38. Alternatively, instead of a single grid of gems 38 as shown in FIG. 2, it is understood that multiple arrays or grids of gems 38 can be provided in one or more housings 60 to display multiple images, such as alphanumeric symbols spelling a name or word, or multiple shapes.

Referring again to FIG. 2, the communication device 20 includes an input/output device 26 configured to receive user inputs for defining the image to be displayed using the system 10. For example, the I/O device 26 can be a touchscreen showing at least one icon 62. The icon 62 can represent alphanumeric symbols which, when actuated, cause the communication device 20 to transmit corresponding wireless signals 40 to the receiver 32 in the housing 50 to cause the gems 38 to be selectively illuminated and to change their optical properties to display the symbol according to the user input.

In addition, the selective illumination can include selectively timing the lighting of the gems 38 to change their optical properties at different times. For example, a gem 38 on the item of jewelry 30 can be strobed or flickered. The timing also can also be used to allow the eye to see and adjust to the characters displayed and to give enough time to be able to read the characters, such as a string of characters forming a word or a sentence. The timing can also be controlled for pause and effect between a sequence of characters being displayed, or displayed at various times and intervals. The lighting duration, timing, and display of characters can be user-controlled, can be pre-defined, or otherwise can be selected or adjusted to be selectively illuminated.

In addition, the intensity of light from the gems 38 can be selectively controlled. Since the FL or other visual properties of gems 38 may not be equal, then the visual appearance of the jewelry or the pixilation of the gems 38 can appear unequal or varying. The system 10 is capable of varying the intensity of the light source 36 to each of the gems 38 to equalize the visual appearance of the gems 38 to the user's eye as much as possible.

In an embodiment, the gem 38 can be artificial and not a natural gem. In another embodiment, the element 38 is not necessarily a gem, but can be any substance that is luminescent or bio-luminescent or alters its colors or appearance due to lighting by a light source 36. An example is a layer of graphene, or some chemical coating or other substance, which can also be used by itself, or along with, around, on, or in the gems 38 to artificially allow such visually perceptible reactions to occur.

In an embodiment, instead of or in addition to using gems 38 responsive to illumination by a light source 36, the system 10 can utilize other types of gems or any known substance which respond to different types of electromagnetic radiation, changes in sound, temperature, humidity, or other characteristics that can be controlled by an appropriate radiation or characteristic-changing source associated with the item of jewelry 30. For example, the characteristic-changing source can be disposed inside, outside, or upon the item of jewelry 30.

Figure 3A:
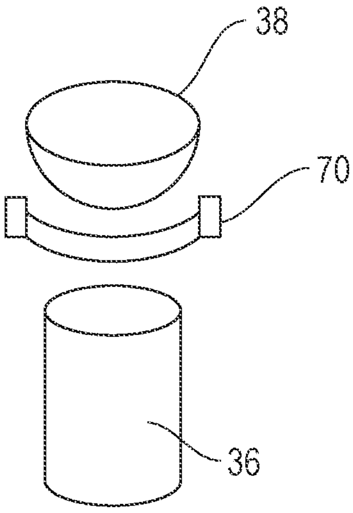
FIG. 3A is a schematic of an example configuration of a gem, a setting, and a light source of a jewelry item, with parts separated.

Referring to FIG. 3A, internal to the housing 60 in FIG. 2, each gem 38 is mounted in a setting 70 and in a line-of-sight to the light source 36. The light source 36 can comprise the emitter which outputs the appropriate electromagnetic radiation (e.g., a UV light-emitting diode, 303) and a light-directing tube 306 for directing illumination toward at least one gem 38. Alternatively, the light source 36 can include elements or tubes for blocking illumination from outside light sources. For example, the light source 36 to one or more gems 38 can be a single light source, and the system 10 can selectively stop the light by blocking the tubes or passage of light to the gems 38 through the tube or other light passing or blocking vessels. In this way, the single light source illuminates the gems 38 by selectively closing the light path through a series of mechanically or electronically controlled relay systems. Accordingly, the gems 38 can be arranged to respond only to illumination from the light source 36, allowing selective control of the illumination of the gems 38. The gems 38 can be in the setting 70 using various types of known prongs or setting types. The prongs can be made in different patterns to show different illusions or designs themselves by covering a gem in various places, such as a star design, a triangle, etc. to add more variance in the visual designs that are capable of being output using the jewelry item. Various areas of the setting 70 can be left open to allow outside light through to allow gems 38 to be seen better, have more luster, or appear brighter as well. In addition, greater enclosing of each gem 38 in their prongs or settings 70 can reduce the light spreading to nearby gems. Thus, the use of enclosing prongs or settings 70 reduces the spread of light to surrounding gems that could cause the surrounding gems to glow when not needed or desired by the user.

Figure 8:
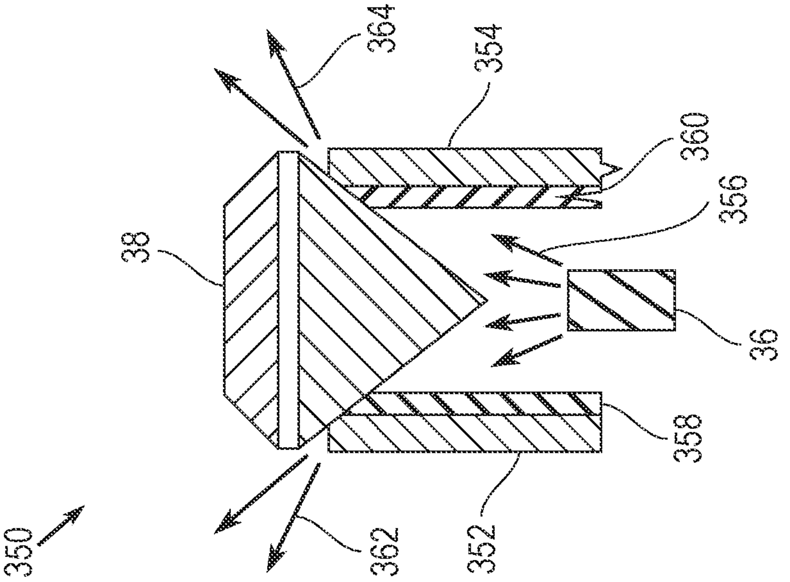
FIG. 8 illustrates a gem mounted adjacent to a light source.
Figure 7:
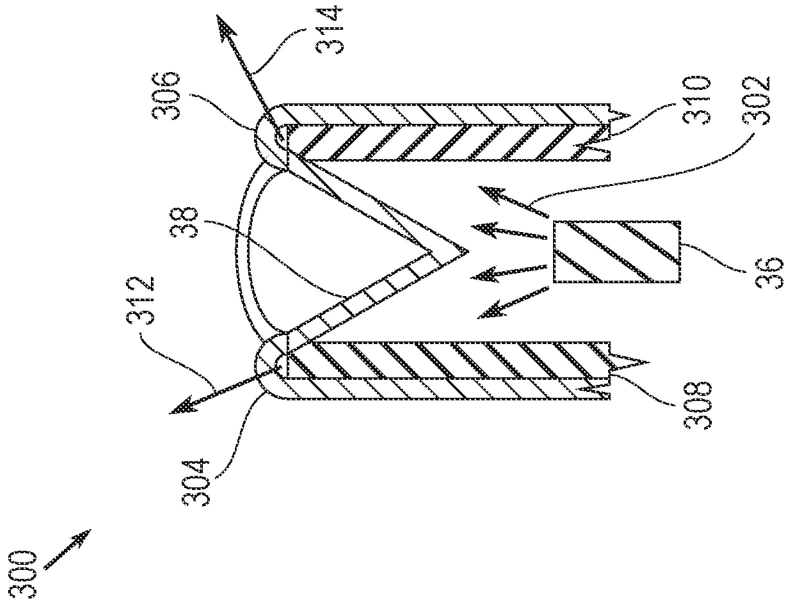
FIG. 7 illustrates a gem retained by prongs adjacent to a light source.

In alternative embodiments, as shown in FIGS. 7-8, a coating can be disposed on internal walls of the setting or on prongs of the setting to reduce or enhance the effect of light on the gem 38. The setting of a gem 38 can be flush or not fully covered, allowing light to exit from the setting, such as the metal, walls, and sides of the setting, and also creating various visual effects of the gem 38. Referring to FIG. 7, a setting 300 has the gem 38 disposed adjacent to a light source 36 emitting light 302 towards the gem 38 to illuminate the gem 38 as described above. At least one prong 304, 306 retains the gem 38 adjacent to the light source 36. At least one coating 308, 310 can be disposed adjacent to the gem 38 and the light source 36. For example, the coating 308, 310 can be disposed on an inner surface of a respective prong 304, 306. The coating 308, 310 reduces or eliminates light leakage 312, 314 from the setting 300. The coating 308, 310 can be any known material having a black or dark color to reduce or eliminate the light leakage 312, 314. Alternatively, the coating 308, 310 can be any other color or combination of colors or materials capable of reducing or eliminating the light leakage 312, 314. In a further embodiment, the coating 308, 310 can be reflective of the light leakage 312, 314 to contain the light leakage 312, 314 in the setting 300, or to enhance the light illuminating the gem 38.

Referring to FIG. 8, an alternative setting 350 has the gem 38 disposed on at least one mounting 352, 354 to be adjacent to a light source 36 emitting the light 356 towards the gem 38 to illuminate the gem 38 as described above. At least one coating 358, 360 can be disposed adjacent to the gem 38 and the light source 36. For example, the coating 358, 360 can be disposed on an inner surface of a respective mounting 352, 354. The coating 358, 360 can be any known material having a black or dark color to reduce or eliminate the light leakage 362, 364. Alternatively, the coating 358, 360 can be any other color or combination of colors or materials capable of reducing or eliminating the light leakage 362, 364. In a further embodiment, the coating 358, 360 can be reflective of the light leakage 362, 364 to contain the light leakage 362, 364 in the setting 350.

In an embodiment, the gems 36 can be arranged according to their respective visual properties in order to add more variance in the visual designs that are capable of being output using the jewelry item. For instance, a given gem 38 can be arranged nearby gems of a different FL color-displaying nature, such as red, blue, green, etc. The mix of one or more of the colors close by, or when one gem is placed on top of another or partially covering one another by a setting style, can create a totally new color, for example, due to the merger of two or more colors. Furthermore, although the gems are shown as being arranged in a two-dimensional x-y plane, the gems can be arranged in three dimensions.

In another embodiment, the FL or other light types, light sources, or agents are controlled by the processor 22 by the sending of the message to the receiver 32 and the controller 34 to selectively light a selected gem based on the type of gem and the timing of lit up points needed or desired. In addition, the system 10 can generate light of multiple spectrums with multiple colors or color schemes. Referring again to FIG. 3A, the setting 37 can include a casing for the light to prevent light from going from one lit gem 38 to an adjacent gem. Such a casing can use a hollow tubular part 306 that goes directly below only one gem at a time or any such method that allows either a single point of light or single gem to be shown light upon. Furthermore, a system of mirrors or reflectors can be included that can be moved, or placed to shine or reflect the light at the particular location needed or desired to illuminate one or more gemstones. A mirror, reflector, or reflecting surface can be arranged on the top or bottom or sides of the gem, or inside hollow tubes, or a combination of positions.

Figure 3B:
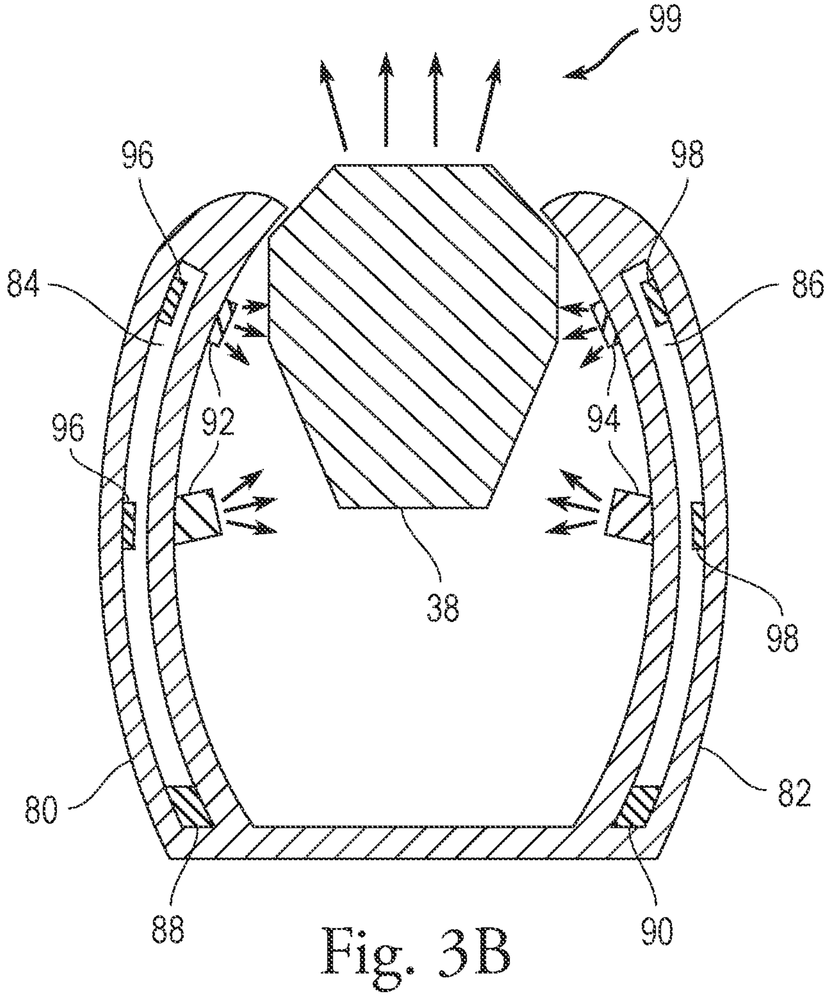
FIG. 3B is a schematic of a gem retained by hollow prongs.

Referring to FIG. 3B, the gem 38 can be mounted between at least a prong 80, 82 having a hollow tube 84, 86 therein, respectively. Each hollow tube 84, 86 can extend through a fully hollowed out prong, a partially hollowed out prong, or a semi-hollowed out prong for conveying light from a light source 88, 90, respectively. In addition, the hollow tubes 84, 86 can also retain fiber optic cables disposed therein to convey the light from the light sources 88, 90. The prongs 82, 84 have exits 92, 94, respectively, for light to exit from the hollow tube 84, 86 to be emitted onto the gem 38. In addition, a reflective element 96, 98, which can include a mirror, a reflector, a reflective surface, or a polished surface, can be positioned adjacent to the respective exits 92, 94 to reflect the light towards the exits 92, 94 to increase the light from the light sources 88, 90 to be emitted towards the gem 38.

The light from the light sources 88, 90 passes through the prongs 80, 82 to illuminate the gem 38, which causes the gem 38 to respond by emitting light 38. For example, the light sources 88, 90 can emit UV light. The prongs 82, 84 and the components 92, 94, 96, 98 direct the UV light towards and incident on the gem 38 to cause the gem 38 to emit FL or PH as light or as a glow or afterglow.

The selective lighting of gems 38 can also be controlled to enhance certain types of inclusions. That is, different gems 38 can have their colors changed while a specific gem 38 near the other gems can be unchanged, which can be used as a further design element. In an example embodiment, each gem in a grid of gems 38, shown in FIG. 2, can have an index or a set of coordinates associated with the gem and stored in the memory 24. When the inputs are received from the user or other sources through the input/output device 26, the processor 22 can determine the locations of the gems to be illuminated by accessing the memory 24 and retrieving the indices or coordinates of the gems to be illuminated from the memory 24. The processor 22 then converts the inputs to activation signals for illuminating a selected gem at the corresponding index or coordinates in the grid of gems 38. The activation signals are sent from the processor 22 through the communication interface 28 to the receiver 32 in the jewelry 30. In turn, the activation signals are sent to the controller 34 to selectively control the light source 36 to illuminate the gem 38 at the corresponding locations on the grid of gems in the jewelry 30.

For example, a black inclusion can pop out more under certain colors or spectra of light over a white inclusion. In an example of such black and white inclusions, a grid of gems 38 can be used to give resemblance of, for example, the shape of an eye in an image. The natural gem color or color graduation itself can be enhanced by the system 10 to differentiate or enhance the design elements provided by the gems 38. As shown in FIG. 2, the area of the grid of gems 38 can be a small area or partial area, or can be the total face of the item of jewelry 30 having the gems 38 that are reacting to selectively incident light, or that are non-reacting gems.

In a further embodiment, the user using a smartphone as the communication device 20 can define or create an image using the touch screen, and the user-input image can be sent to the item of jewelry 30 to selectively illuminate the gems 38 in an array or grid to display the customized image. In other embodiments, a user employs known types of input/output devices 26 to type, define, draw, or otherwise specify a set of characters or images through the smartphone. The user can also attach visual, video, audio, and sensory files along with settings for timing and execution of such visual, video, audio, and sensory effects specified by the corresponding files. Such files and settings can control any other known devices such as an audio speaker, a smartphone camera, or vibrations of the item of jewelry 30, as well as any other attachments other than the lighting system of the gems 38. Such inputted user-specified characters or images are then translated into signals conveyed to the item of jewelry 30 for selectively controlling the illumination of the gems 38. In another embodiment, the user employs a known type of input/output device 26 displaying a grid or array of pixels, which are selected by the user to specify a set of characters or images through the smartphone. The selected pixels on the grid or array displayed by the smartphone are then translated into signals conveyed to the item of jewelry 30 for selectively controlling the illumination of the gems 38.

Using the smartphone and the icons 62, a user can purchase a pre-defined object or image and the pre-defined object or image, and execute other instructions, as well as purchase any pre-defined visual, audio, sensory, and execution files, can be sent to the item of jewelry 30 to selectively illuminate the gems 38 in an array or grid to display the purchased object or image. In addition, depending on the nature of the purchased items, the item of jewelry 30 can execute the pre-defined visual, audio, sensory, and execution files.

It is understood that, for finer pixels and greater granularity of an image, the array comprises a greater number of gems 38 that are smaller in size. In addition, the style and shapes of the settings 70 shown in FIG. 3A must be closer. The settings 70, acting as gem holders, can be composed of various metals, treated metals, synthetic materials, or even a glue or some synthetic resin or material, as well as polymers, crystals, resins, metals, non-metals, liquids, or any known material, preferably of a see-through or transparent/translucent nature. The gem 38 can also be layered in between one or more materials, for example between two polymer-based plates or resins.

In a further embodiment, other functionalities can be added to the item of jewelry 30 by adding other instruments or devices, such as a light sensor or input devices (e.g., buttons, touch sensors, audio devices, a camera, a display, and LCD), to accept gestures or touches from a user, or to receive command inputs to perform a set task. For example, a light or touch sensor on the item of jewelry 30 can be used to receive a reply from the user to a text message received at the smartphone of the user. In an embodiment, the smartphone can output the text via the item of jewelry 30 by selectively illuminating the gems 38 on the jewelry 30 for the user to read. The sensor on the jewelry item can also be configured to detect a hand or finger being passed over the sensor indicating the user's instructions to provide a response. In an embodiment, certain gems can include sensors provided below the gems that configured to detect when the light is blocked above the gems. Gestures by the user over such below-gem sensors can thus be detected by the controller 34 and cause the controller to generate a response according to the gesture(s). Accordingly, a user does not need to take out the smartphone from the pocket or handbag of the user, yet the user can still respond to a text using the item of jewelry 30 as an input device.

In addition, in an embodiment, the light from illuminated gems 38 can also be obstructed or passed by a single or series of light-blocking and light-allowing objects, such as discs, gears, other gems, polymers, plastics, glass, etc., for example, in a watch-like configuration. The series of light-blocking objects and light-allowing objects can be electronically or mechanically controlled to open, close, or otherwise move, and either block, allow, partially block, or partially allow the light to pass. Such objects can be moving objects that change position and patterns to either allow full illumination or partial illumination of the gem, or block the access to light, from one direction or from any selective direction. For example, the light can be on the inner side walls of a watch face facing the gem 38, with the light shined on the desired gem as the light passes through a casing housing the light source attached to the inner walls to indicate the time. The casing can be composed of a polymer, plastic, glass, or any other known material.

In another example, the item of jewelry 30 can include a moving or rotating disc or other objects which allow or block light from the gems 38. The disc or other objects can include gears, other gems, polymers, plastics, glass, etc. The disc or objects can have at least one aperture or other shapes. The aperture or shape of the moving disc or object can form a path for the light to go around a face, below a surface, or around inner or outer sides of the item of jewelry 30. One or more of the gems 38 can be studded or otherwise disposed in or on the disc or object.

Referring again to FIG. 3A, the gem 38 can be set on a setting 70 or holder that can be moving. The setting 70 or holder can be part of the jewelry 30. Alternatively, the setting 70 or holder is not part of the jewelry 30. Alternatively, the various parts 36, 38, 70 can be detachable from each other. The various parts can be collectively or individually be a part of each other, or can be removably detachable from each other. For example, at least one gem 38 can be set on a second hand of a watch, with illumination of the at least one gem 38 causing FL or other changes in the natural visual properties of the at least one gem 38 as the at least one gem 38 moves around the face of the watch. The gem 38 or its corresponding setting 70 can be held, held magnetically, not held, or not held magnetically by the item of jewelry 30. For example, using a magnetic setting 70, the gem 38 can magnetically float in the region of the item of jewelry 30. Alternatively, the gems 38 can be encased or otherwise housed by a polymer, plastic, glass, or metal structure which is at least partially see-through, transparent, or semi-transparent. The setting 70 can be hollow and filled with transparent or translucent liquid, allowing light from the light source 36 to enter and exit, and then to be incident to the gem 38. Items other than or in addition to a gem 38 can be placed in the setting 70 as well.

In a further embodiment, the gem 38 can be placed or held in a separate container disposed adjacent to the light source 36. Alternatively, the gem can be placed or held in or between sheets of material disposed adjacent to the light source 36, such that the gem 38 is not required to be held by individual prongs or settings 70. For example, a gem 38 can be freely moving in such containers or sheet structures. The sheets of material can be composed of polymers, plastics, glass, adhesives, crystals, metals, or non-metals.

Figure 4:
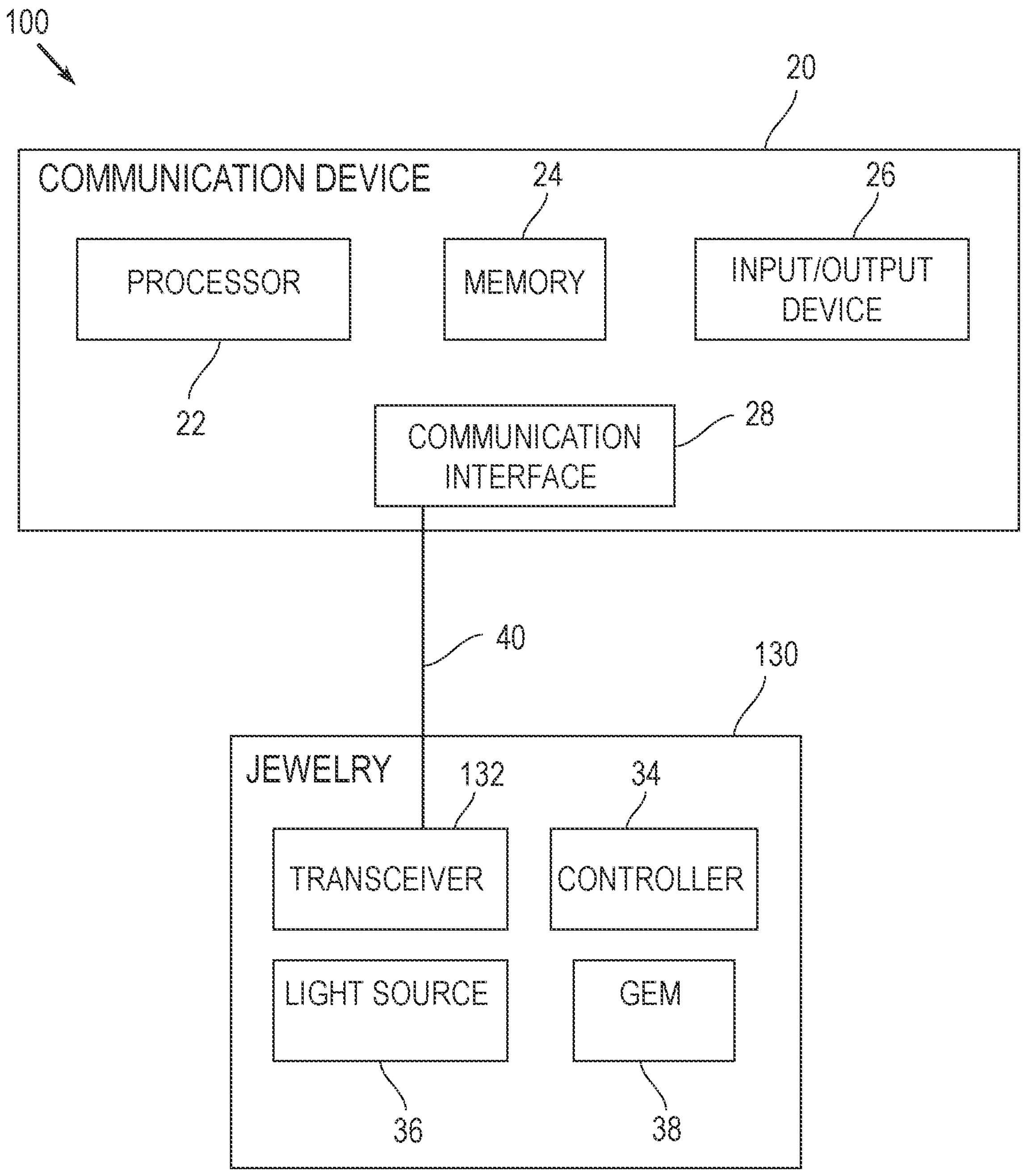
FIG. 4 is a schematic of a system for selectively illuminating gems in a jewelry item, according to an embodiment.

FIG. 4 is a schematic of a system for selectively illuminating gems in a jewelry item, according to an embodiment. In the embodiment shown in FIG. 4, the system 100 includes a communication device 20 and the item or piece of jewelry 130. The communication device 20 includes a processor 22, a memory 24, an input/output device 26, and a communication interface 28. The item of jewelry 130 includes a transceiver 132, a controller 34, a light source 36, and a gem 38. The communication device 30 can be a computing device having a central processing unit (CPU). Alternatively, the communication device 30 can be a cellular phone, a smartphone, or other processing devices to relay messages at least to the item of jewelry 30 through the communication interface 28 using wireless signals 40 with a communication protocol, such as Bluetooth or WiFi. The relayed messages can correspond to user inputs entered by a user through the input/output device 26.

By using a transceiver 132 in the jewelry item 130, the communication device 30, such as a smartphone, can transmit and receive wireless signals 40 to and from the jewelry item 130, respectively. For example, an app on the smartphone can establish a two-way communication connection with the jewelry 130.

Figure 5:
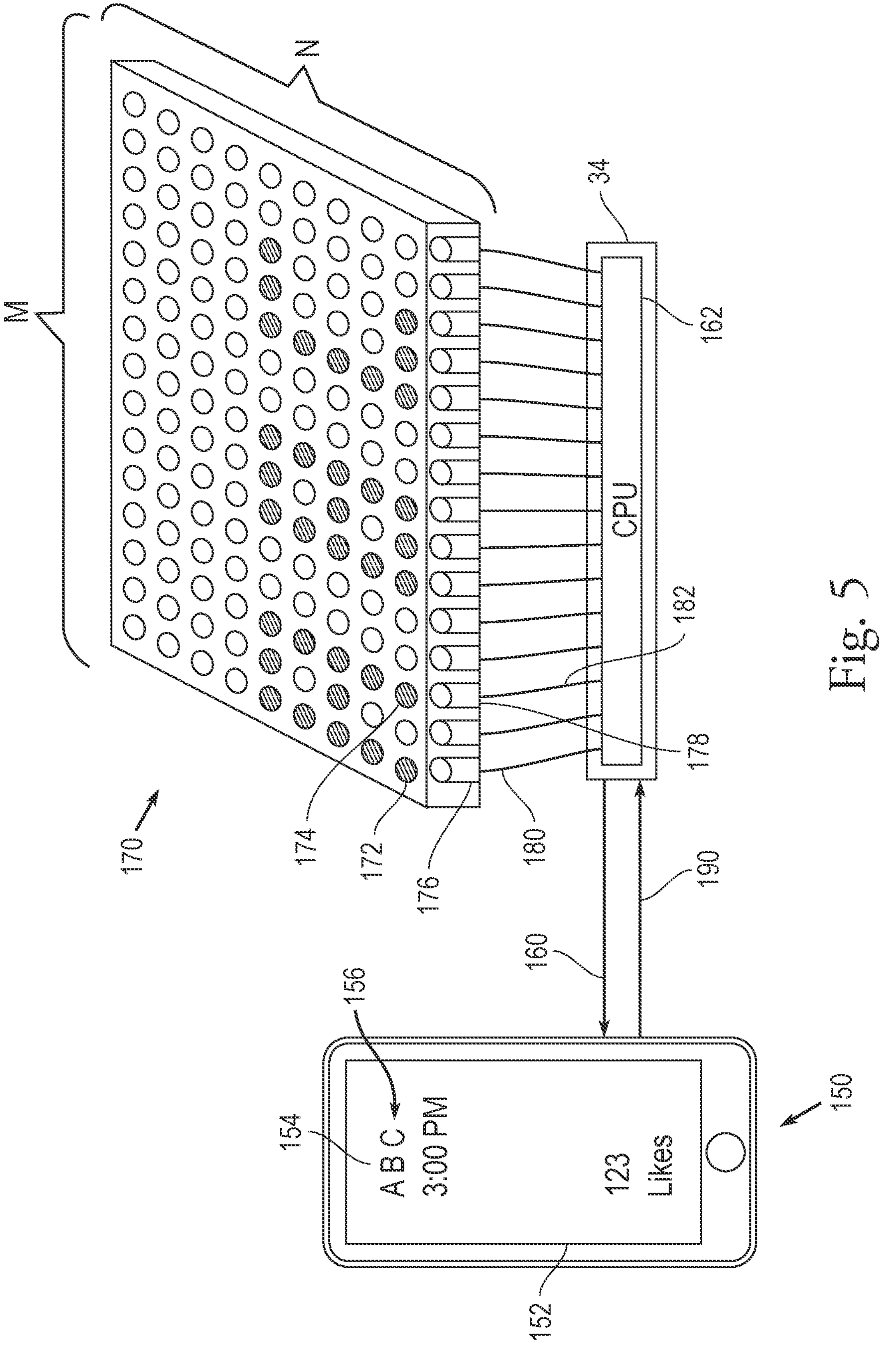
FIG. 5 is a schematic of a system for selectively illuminating gems in a jewelry item, including a grid of gems interacting with a smartphone, according to an embodiment.

FIG. 5 is a schematic of a system for selectively illuminating gems in a jewelry item, according to an embodiment. Referring to FIG. 5, a smartphone 150 with a display screen 152 executes an app 154. Through the app 154, a user can create a customized message, emoji, graphic, design, or other image 156, such as "ABC", or a visual, audio, sensory, or executable file, as well as timing settings to match each type of visual, audio, and sensory effects; for example, using a stylus or a finger of the user on the display screen 152, such as a touchscreen or input speakers for audio. The app 154 of the smartphone 150 translates the input image 156 into a signal 160 representing a dataset encoding the image 156 into a format suitable for being output using the jewelry item and any other devices. The signal 160 is transmitted, through the communication interface 28 and the transceiver 132, to a central processing unit (CPU) 162 of the controller 34. The CPU 162 is electrically coupled to a grid 170 of gems 172, 174 of the jewelry item 130. The grid 170 can be an M×N array of gems 172, 174. Beneath each gem 172, 174 is a corresponding light source 176, 178 that are individually controlled by the CPU 162. For instance, the CPU 162 is configured to send control signals to activate or otherwise control light sources 176 and 178 via connections 180, 182, respectively, which are generated by the CPU 162 from the signal 160. Accordingly, the encoding of the image 156, such as "ABC", by the smartphone 150 is translated into signals 180, 182 to respectively activate or not activate the light sources 176, 178, respectively, to selectively block or not block the light sources 176, 178, respectively, and to selectively illuminate specific gems 172, 174. Accordingly, the illuminated gems 172, 174 have their optical properties and characteristics selectively controlled, such that the number of gems, the respective gemstone fluorescence/colors, and other features of the gems that can be selectively enhanced or diminished through selective irradiation, etc. For example, as shown in FIG. 5, the gems 172, 174 of the grid 170 spell out an "A", an "B", and a "C", corresponding to the user-input image 156. Using the transceiver 132 in FIG. 4, the controller 34 can send a signal 190 to the app 154; for example, to acknowledge the illumination of the gems 172, 174.

Figure 6:
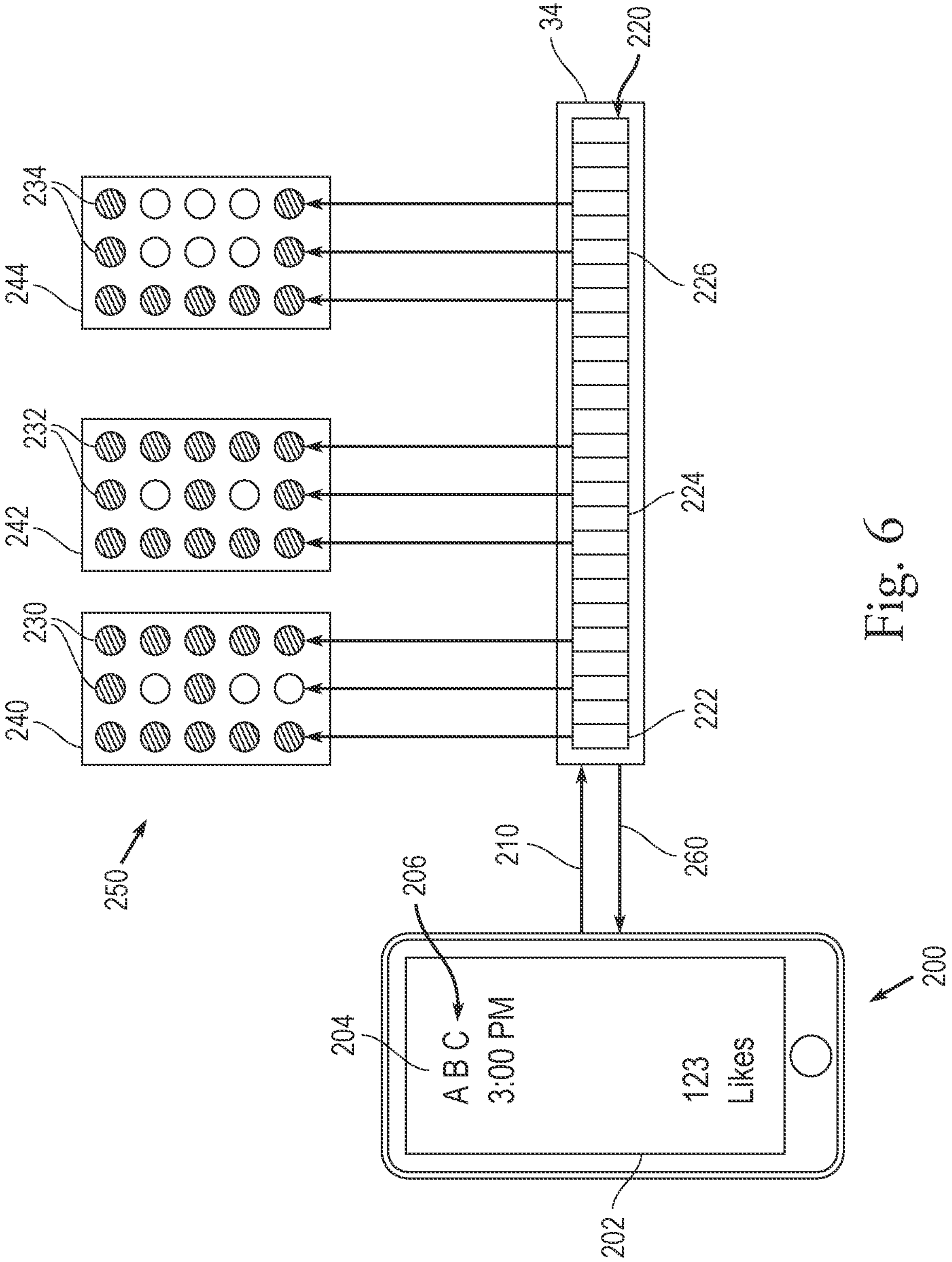
FIG. 6 is a schematic of a system for selectively illuminating gems in a jewelry item, according to an embodiment.

Referring to an alternative embodiment in FIG. 6, a smartphone 200 with a display screen 202 executes an app 204. Through the app 204, a user can create a customized message, emoji, graphic, design, or other image 206, such as "ABC", for example, using a stylus or a finger of the user on the display screen 202, such as a touchscreen. The app 204 of the smartphone 200 translates the input image 206 into a signal 210 representing a dataset encoding the image 206. The signal 210 is transmitted, through the communication interface 28 and the transceiver 132, to at least one register 220 of the controller 34. At least one memory unit 222, 224, 226 of the register 220 corresponds to a respective gem 230, 232, 234 of a grid 240, 242, 244 of gems. The grids 240, 242, 244 can be arranged in an array 250. The array 250 can be linear, or can be a set of arrays in a two-dimensional or three-dimensional arrangement. The memory units 222, 224, 226 can be bits, bytes, words, or other data structures configured to specify whether a given gem 230, 232, 234 is illuminated or not illuminated, the brightness of the illumination, the color of the illumination, etc. Using the register 220, the illumination parameters of the gems 230, 232, 234 can be specified, for example, to generate a refreshing raster image. The register 220 specifies the number of gems, the respective gemstone fluorescence/colors, other features of the gems that can be selectively enhanced or diminished through selective irradiation, etc.

As shown in FIG. 6, the memory unit 222 corresponds to a gem 230 in the grid 240, the memory unit 224 corresponds to a gem 232 in the grid 242, and the memory unit 222 corresponds to a gem 234 in the grid 244. The grids 240, 242, 244 can be illuminated to display an "A", a "B", and a "C", respectively, of the image 206 input on the smartphone 200. In an example embodiment, the grids 240, 242, 244 can be 3×5 grids of gems, with each gem 230, 232, 234 acting as a pixel. Grids 240, 242, 244 can have more gems, such as an 8×8 grid, for greater granularity in the displayed message or image 206. In addition, using the transceiver 132, the controller 34 can send a signal 260 to the app 204; for example, to acknowledge the illumination of the gems 230, 232, 234. Alternatively, the controller 34 can send a signal 260 to the app 204 indicating a fault or failure of one or any of the gems 38 or other devices of the item of jewelry 30 to complete any task, process, or instructions.

Figure 11:
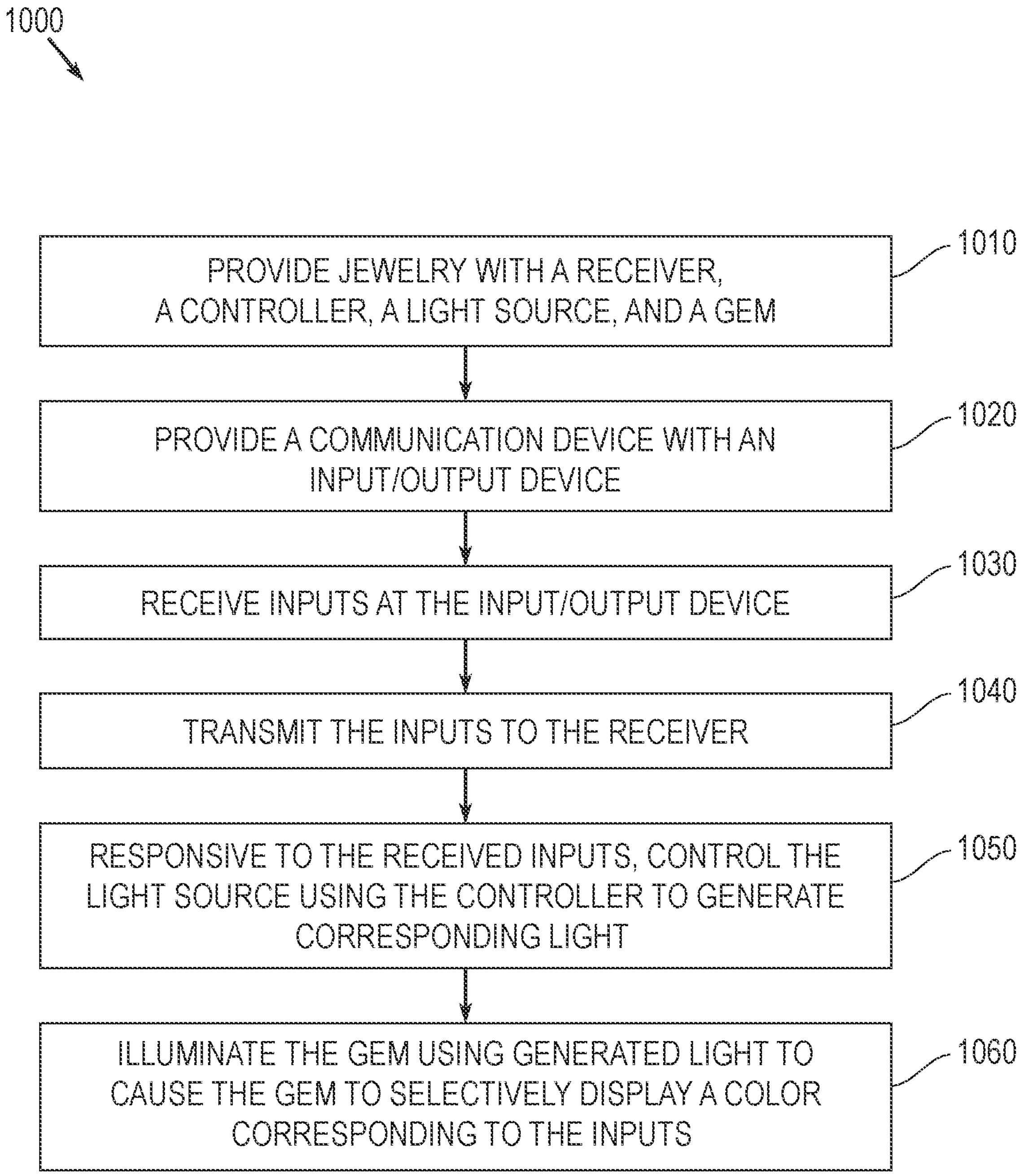
FIG. 11 is a flowchart of a method for selectively illuminating gems in a jewelry item, according to the embodiment.

As shown in FIG. 11, the method 1000 of operation of the system 10 includes the step of providing jewelry 30 in step 1010 with a receiver 32, a controller 34, a light source 36, and a gem 38. The receiver 32 receives signals which are translated into instructions by the controller 34. The instructions are received by a respective light source 36 to selectively illuminate a respective gem 38 housed in the jewelry 30. The method 1000 also includes the step of providing a communication device 20 in step 1020 with an input/output device 26. The communication device 20 can be a smartphone 200, with the input/output device 26 implementing a touchscreen. The method 1000 then receives inputs from a user at the input/output device 26 in step 1020 using the input/output device 26. Accordingly, the user can input a customized message or other images to be selectively displayed by the gems 38 of the jewelry 30. A processor 22 of the communication device 20 processes the inputs to generate corresponding signals, and transmits the signals using a communication interface 28 to the receiver 32 in step 1040. In step 1050, the controller 34 is responsive to the received signals to control the light source 36 to generate corresponding light. In step 1060, the generated light is used to illuminate the gem 38 to cause the gem 38 to selectively display a color corresponding to the inputs from the user at the input/output device 26. By selectively displaying colors of the gems 38, the jewelry 30 collectively displays the customized message or other images.

In an alternative embodiment, a single light source illuminates all of the gems, with multiple light blocking elements selectively stopping the light from being incident on selective gems. In a further embodiment, a single light source illuminates all of the gems, and selectively affects the optical and visual properties of the gems, based on the operation of the single light source, visual conditions, and flickering of the single light source and the gems. Such selective affecting of the optical and visual properties of the gems can show a pattern of images caused by any arrangement of the gems based on the light changing properties of the gems. Portions of the methods described herein can be performed by software or firmware in machine readable form on a tangible (e.g., non-transitory) storage medium, and can be embedded into a chip on or in the item of jewelry 30. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor, a serial processor, a quad processor, or any other known processor such that various actions described herein can be carried out in any suitable order, or simultaneously.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An item of jewelry, comprising:

a plurality of gems, each of a type configured to fluoresce or phosphoresce in the case of being irradiated by a first type of light, wherein at least two of the plurality of gems have fluorescing or phosphorescing properties that are non-uniform;

a plurality of light sources, with each light source adjacent to a corresponding one or more of the plurality of gems and configured to emit the first type of light, wherein the emitted first type of light is reachable to the corresponding adjacent one or more of the plurality of gems; and a controller responsive to a received input and configured to selectively control the plurality of light sources to selectively illuminate at least one of the plurality of light sources to shine the first type of light on the corresponding adjacent one or more of the plurality of gems and to selectively change a state of fluorescence or phosphorescence of the corresponding adjacent one or more of the plurality of gems and corresponding to the received input, wherein the controller is configured to selectively adjust an intensity of each light source according to a respective fluorescing or phosphorescing property of the corresponding one or more of the plurality of gems adjacent thereto to have the at least two of the plurality of gems fluoresce or phosphoresce uniformly.

2. The item of jewelry of claim 1, further comprising a receiver configured to receive the input.

3. The item of jewelry of claim 2, wherein the receiver receives the input over a communication protocol selected from Bluetooth or WiFi.

4. The item of jewelry of claim 1, wherein the received input is received from a communication device.

5. The item of jewelry of claim 4, wherein the communication device is selected from the group consisting of: a central processing unit (CPU), a cellular phone, and a smartphone.

6. The item of jewelry of claim 1, wherein each of the plurality of light sources is selected from the group consisting of: an ultraviolet (UV) light source, a microwave light source, a radio wave light source, and an optical light source; and the light shined on each of the plurality of gems corresponding to the respective one of the plurality of light sources corresponds to the type of the respective one of the plurality of light sources.

7. A system, comprising:

a communication device including:

a processor;

an input/output device configured to receive a user input from a user, and configured to output the user input to the processor; and a communication interface configured to transmit the user input; and an item of jewelry, including:

a plurality of gems arranged in an array, each of a type configured to fluoresce or phosphoresce in the case of being irradiated by a first type of light;

a plurality of light sources, with each light source adjacent to a corresponding one or more of the plurality of gems and configured to emit the first type of light, wherein the emitted first type of light is reachable to the corresponding adjacent one or more of the plurality of gems;

a receiver configured to receive the transmitted user input; and a controller responsive to the received input and configured to selectively control the plurality of light sources to selectively illuminate at least one of plurality of light sources to shine the first type of light on the corresponding adjacent one or more of the plurality of gems and to selectively change a state of fluorescence or phosphorescence of the corresponding adjacent one or more of the plurality of gems and corresponding to the received input, wherein the input/output device is configured to display an array of pixels, the displayed array of pixels corresponding to the array of gems of the jewelry item, wherein the received user input comprises a selection of one or more pixels of the displayed array of pixels, wherein the selected one or more pixels corresponds to a selection of one or more gems of the jewelry item to illuminate, and wherein the controller is configured to selectively control the plurality of light sources corresponding to the received input by:

causing one or more light sources corresponding and adjacent to the selected one or more gems to emit the first type of light, and thereby illuminating, respectively, the one or more gems, and thereby selectively changing the state of fluorescence or phosphorescence of each of the one or more gems.

8. The system of claim 7, wherein each of the plurality of light sources is selected from the group consisting of: an ultraviolet (UV) light source, a microwave light source, a radio wave light source, and an optical light source; and the light shined on each of the plurality of gems corresponding to the respective one of the plurality of light sources corresponds to the type of the respective one of the plurality of light sources.

9. The system of claim 7, wherein the receiver receives the transmitted user input over a communication protocol selected from Bluetooth or WiFi.

10. The system of claim 7, wherein the communication device is a smartphone executing a program to operate with the input/output device.

11. The system of claim 7, wherein the user input corresponds to a control of the intensity of the emitted first type of light, and wherein the controller, responsive to the user input, selectively adjusts an intensity of one or more of the plurality of light sources, causing the one or more light sources corresponding and adjacent to the selected one or more gems to emit the first type of light having the intensity corresponding to the user input, and thereby illuminating, respectively, the one or more gems, and thereby selectively changing the state of fluorescence or phosphorescence of each of the one or more gems.

12. An item of jewelry, comprising:

a plurality of gems, each of a type configured to fluoresce or phosphoresce in the case of being irradiated by a first type of light;

a plurality of light sources, with each light source adjacent to a corresponding one or more of the plurality of gems and configured to emit the first type of light, wherein the emitted first type of light is reachable to the corresponding adjacent one or more of the plurality of gems; and a controller responsive to a received user input and configured to selectively control the plurality of light sources to selectively illuminate at least one of the plurality of light sources to shine or not shine the first type of light on the corresponding adjacent one or more of the plurality of gems and to thereby selectively change a state of fluorescence or phosphorescence of the corresponding adjacent one or more of the plurality of gems and corresponding to the received input, wherein the user input comprises a selection of one or more gems of the plurality of gems to be illuminated and a control of the intensity of the emitted first type of light, and wherein the controller, responsive to the user input, causes one or more light sources corresponding and adjacent to the selected one or more gems to emit the first type of light and selectively adjusts an intensity of the one or more of the plurality of light sources, causing the one or more light sources corresponding and adjacent to the selected one or more gems to emit the first type of light having the intensity corresponding to the user input, and thereby illuminating, respectively, the one or more gems, and thereby selectively changing the state of fluorescence or phosphorescence of each of the one or more gems.

13. The item of jewelry of claim 12, wherein the plurality of gems are arranged in at least one grid, and wherein the plurality of gems act as pixels to generate an image of the pixels on the at least one grid when at least one of the gems is selectively illuminated.

14. The item of jewelry of claim 13, wherein the controller translates the received input into the image of the pixels, and wherein the received input corresponds to a user-defined image.

15. The item of jewelry of claim 12, wherein each of the plurality of gems is disposed vertically above the corresponding light source.

16. The item of jewelry of claim 12, wherein each of the plurality of gems is disposed in one-to-one correspondence with the corresponding light source.

17. The item of jewelry of claim 12, wherein each of the plurality of light sources directs respective light through a light-directing tube to the corresponding one of the plurality of gems.

18. The item of jewelry of claim 12, wherein each of the plurality of gems generates a light-altered reaction in response to the respective illumination from the corresponding light source of the plurality of light sources.

19. A method, comprising:

providing an item of jewelry with a receiver, a controller, a plurality of gems each of a type configured to fluoresce or phosphoresce in the case of being irradiated by a first type of light, and a plurality of light sources with each light source disposed adjacent to a corresponding one or more of the plurality of gems and oriented to illuminate the corresponding adjacent one or more of the plurality of gems with a first type of light, wherein each light source is configured to emit the first type of light, and wherein each of the plurality of gems is of a type configured to fluoresce or phosphoresce in the case of being irradiated by the first type of light;

receiving a user input from a user via an input/output device;

responsive to the received user input, selectively controlling the plurality of light sources using the controller; to selectively illuminate at least one of the plurality of light sources to shine the first type of light on the corresponding adjacent one or more of the plurality of gems and to selectively change a state of fluorescence or phosphorescence of the corresponding adjacent one or more of the plurality of gems and corresponding to the received input, wherein the controller is configured to selectively adjust an intensity of each light source according to a respective fluorescing or phosphorescing property of the corresponding one or more of the plurality of gems adjacent thereto to have the at least two of the plurality of gems fluoresce or phosphoresce uniformly.

20. The method of claim 19, wherein each of the plurality of light sources is selected from the group consisting of: an ultraviolet (UV) light source, a microwave light source, a radio wave light source, and an optical light source; and the light illuminating the at least one gem corresponds to the type of light source.

21. The method of claim 19, wherein the receiver receives the input over a communication protocol selected from Bluetooth or WiFi.

22. The method of claim 19, further comprising a communication device including a smartphone executing a program to operate with the input/output device.

23. An item of jewelry, comprising:

a gem of a type configured to fluoresce or phosphoresce in the case of being irradiated by a first type of light;

a prong adjacent to the gem, the prong having a hollow tube therein, wherein the hollow tube has a first opening and a second opening, wherein the prong is configured to direct the first type of light to the gem;

a light source adjacent to the prong, and configured to emit the first type of light into the first opening, wherein the emitted first type of light is conveyed through the hollow tube to the second opening and is reachable to the gem; and a controller responsive to a received input and configured to selectively control the light source to selectively illuminate the light source to shine the first type of light through the hollow tube onto the gem and to selectively change a state of fluorescence or phosphorescence of the gem corresponding to the received input.

24. The item of jewelry of claim 23, further comprising:
a fiber optic cable disposed in the hollow tube, wherein the fiber optic cable extends from the first opening to the second opening, wherein the fiber optic cable is configured to convey the emitted first type of light from the first opening through the hollow tube to the second opening.

25. The item of jewelry of claim 23, further comprising:
a reflective element adjacent to at least one of the openings to reflect the emitted first type of light towards one of the first and second openings to increase the emitted first type of light from the light source.

26. The item of jewelry of claim 23, wherein the prong includes a plurality of prongs,
wherein the gem includes a plurality of gems, and
wherein at least one of the plurality of gems is configured to engage at least one of the plurality of prongs.

27. An item of jewelry comprising:
a plurality of gems, each of a type configured to fluoresce or phosphoresce in the case of being irradiated by a first type of light;
a plurality of light sources, with each light source adjacent to a corresponding one or more of the plurality of gems and configured to emit the first type of light, wherein the emitted first type of light is reachable to the corresponding adjacent one or more of the plurality of gems; and
a controller responsive to a received input and configured to selectively control the plurality of light sources to selectively illuminate at least one of the plurality of light sources to shine the first type of light on the corresponding adjacent one or more of the plurality of gems and to selectively change a state of fluorescence or phosphorescence of the corresponding adjacent one or more of the plurality of gems and corresponding to the received input,
wherein each of the plurality of light sources is configured to emit at least the first type of light or a second type of light different from the first type of light, and
wherein the controller is configured to selectively control the plurality of light sources to emit the first and second types of light, respectively, to selectively illuminate one or more of the plurality of gems with the first type of light to fluoresce or phosphoresce, and to selectively illuminate the one or more of the plurality of gems with the second type of light to not fluoresce or to not phosphoresce.

* * * * *